US006520776B1

(12) United States Patent
Furukawa

(10) Patent No.: US 6,520,776 B1
(45) Date of Patent: Feb. 18, 2003

(54) PORTABLE KARAOKE MICROPHONE DEVICE AND KARAOKE APPARATUS

(75) Inventor: Kouji Furukawa, Kyoto (JP)

(73) Assignee: U's BMB Entertainment Corp., Osaka (JP)

(*) Notice: Subject to any disclaimer, the term of this patent is extended or adjusted under 35 U.S.C. 154(b) by 0 days.

(21) Appl. No.: 09/600,331

(22) PCT Filed: Apr. 16, 1999

(86) PCT No.: PCT/JP99/02054

§ 371 (c)(1), (2), (4) Date: Jul. 11, 2000

(87) PCT Pub. No.: WO00/28522

PCT Pub. Date: May 18, 2000

(30) Foreign Application Priority Data

Nov. 11, 1998 (JP) .......................................... 10-320946

(51) Int. Cl.[7] .......................... G09B 15/04; G10H 1/36

(52) U.S. Cl. ............................ 434/307 A; 434/307 R; 84/610; 341/176

(58) Field of Search ............................ 434/307 R–309, 434/365, 318; 84/600, 609, 610, 634, 644, 645; 386/54, 102; 341/173, 176; 369/47.23; 360/61; 370/437; 725/138, 141

(56) References Cited

U.S. PATENT DOCUMENTS 5,598,162 A * 1/1997 Terashima et al. .......... 341/176
5,805,761 A * 9/1998 Ikeda .......................... 386/54
5,808,224 A * 9/1998 Kato ........................... 84/609
6,022,223 A * 2/2000 Taniguchi et al. ...... 434/307 A
6,025,553 A * 2/2000 Lee ............................. 84/610
6,267,600 B1 * 7/2001 Song ...................... 434/307 A

FOREIGN PATENT DOCUMENTS

| | | | |
|---|---|---|---|
| EP | 0 675 666 A1 | * | 10/1995 |
| JP | 7-212886 | * | 8/1995 |
| JP | 8-126069 | * | 5/1996 |
| JP | 9-281982 | * | 10/1997 |
| JP | 11-249669 | * | 9/1999 |
| WO | WO 94/27282 | | 11/1994 |
| WO | WO 99/35631 | * | 7/1999 |

* cited by examiner

*Primary Examiner*—Joe H. Cheng
(74) *Attorney, Agent, or Firm*—Koda & Androlia

(57) ABSTRACT

A portable karaoke microphone device and karaoke apparatus in which accompanying melody data and character data such as lyrics, etc. are written into a first memory that consists of an EEPROM such as a flash memory, etc. This first memory is detachably connected to a first memory connector of a microphone device. An acoustic signal is created by synthesizing accompanying melody data from the first memory and a voice electrical signal from a microphone element. Furthermore, a composite video signal is created using background image data from an internal second memory. The creation of acoustic and video outputs is accomplished by the acoustic signal and composite video signal using a household television set. Alternately, a carrier wave with a television broadcast channel frequency may be modulated with the acoustic signal and composite video signal, and transmitted.

8 Claims, 9 Drawing Sheets

PORTABLE KARAOKE MICROPHONE DEVICE AND KARAOKE APPARATUS

TECHNICAL FIELD

The present invention relates to a portable karaoke microphone device and a karaoke apparatus which are used for so-called "karaoke", in which accompanying melodies are automatically played.

BACKGROUND ART

In the prior art, a recording medium such as a laser disk, video disk, etc. is played back in a karaoke apparatus main body which is fixed in a room. A portable microphone is connected to this karaoke apparatus main body via a flexible cord, and the voice signal from the microphone and accompanying melody played back by the karaoke apparatus main body are transmitted to speakers so that the sound is output. At the same time, characters indicative of the title of the tune and lyrics of the accompanying melody, etc. are displayed along with background images on a display device such as a cathode ray tube, a liquid crystal display device, etc.

In this prior art, the karaoke apparatus main body which is positionally fixed must be operated in order to accomplish the operations such as selection of the accompanying melody, etc.; accordingly, the operating characteristics are poor. Furthermore, the size of the apparatus normally tends to be large. In addition, it is not possible to store a plurality of accompanying melodies on a single recording medium; and it is necessary to prepare a plurality of recording media which are stored with not only the favorite accompanying melodies but also unfavored accompanying melodies. Accordingly, the operating characteristics are poor in this regard as well.

The object of the present invention is to provide a portable karaoke microphone device and karaoke apparatus in which the operating characteristics are improved.

DISCLOSURE OF INVENTION

The present invention provides a portable karaoke microphone device which is characterized in that the microphone device comprises:

(a) a nonvolatile first memory which stores accompanying melody data, (b) a nonvolatile second memory which stores image data, (c) a first memory connector to which the first memory is detachably and replaceably connected, (d) a microphone element which converts a voice signal into an electrical signal, and (e) a processing means which creates an acoustic signal by synthesizing the accompanying melody data from the first memory and the voice signal from the microphone element, and which creates a composite video signal using the image data from the second memory.

According to the present invention, an acoustic signal and a composite video signal are respectively led out from the portable karaoke microphone device, and these signals are transmitted to the acoustic signal input terminal and to the composite video signal input terminal of a television set via, for example, a flexible cord. As a result, karaoke playing and singing can be enjoyed.

Furthermore, the present invention provides a portable karaoke microphone device which is characterized in that the microphone device comprises:

(a) a nonvolatile first memory which stores accompanying melody data, (b) a nonvolatile second memory which stores image data, (c) a first memory connector to which the first memory is detachably and replaceably connected, (d) a microphone element which converts a voice signal into an electrical signal, (e) a processing means which creates an acoustic signal by synthesizing the accompanying melody data from the first memory and the voice signal from the microphone element, and which creates a composite video signal using the image data from the second memory, and (f) a transmission means which transmits a carrier wave that has a television broadcast channel frequency modulated by the acoustic signal and composite video signal from the processing means.

According to the present invention, a television set is provided along with the portable karaoke microphone device, and a carrier wave which has a television broadcast channel frequency is transmitted from this portable microphone device by a transmission means via an electrical signal line or by wireless transmission. This carrier wave is received by the television set, so that an image is displayed, and so that an acoustic output is performed. The accompanying melody data is read out from the nonvolatile first memory installed in the portable microphone device and is synthesized with an electrical signal of the voice of a singer, who is enjoying singing, from the microphone element so that an acoustic signal is created. Furthermore, a composite video signal in which respective horizontal and vertical synchronizing signals are synthesized is created by the processing means using the image data which constitutes the background images and stored in the nonvolatile second memory. The carrier wave which has a television broadcast channel frequency is modulated using the acoustic signal and composite video signal thus obtained from the processing means, and this carrier wave is transmitted. An acoustic carrier wave is frequency-modulated by the acoustic signal, and a video carrier wave is amplitude-modulated by the composite video signal. These carrier waves are transmitted by wireless transmission; and in this case, either electromagnetic waves or infrared radiation may be used.

The first and second memories may be flash memories or memories that are driven by a battery.

With such a portable karaoke microphone device, karaoke playing and singing can easily be enjoyed using, for example, a television set used in an ordinary household, etc.

The character data stored in the first memory may also be, for example a discrimination code assigned to respective characters. The processing device is constructed so that data to be displayed on the display device such as a cathode ray tube, a liquid crystal display device, etc. is created by means of font data or output data from a character selector used to display images in response to the discrimination code assigned to respective characters. As a result, the first memory can be of a smaller storage capacity.

The control data that outputs over time the character data and other image data, etc., of the accompanying melody data stored in the first memory is also stored in the first memory. Such accompanying melody data, etc. stored in the first memory may be created and stored in accordance with MIDI (Musical Instrument Digital Interface) standards.

The present invention is also characterized in that not only the accompanying melody data, but also the character data corresponding to this accompanying melody data, is stored in the first memory, and the processing means reads out the character data stored in the first memory and synthesizes the character images that express characters with the composite video signal.

According to the present invention, the character data that correspond to the accompanying melodies, such as the titles of the tunes, lyrics, etc. is also stored in the first memory, in which the accompanying melody data is stored. Furthermore, image data other than character data that correspond to the accompanying melody data may also be stored in this first memory. Such characters may include symbols, etc., in addition to characters such as hiragana, katakana, kanji (Japanese), numerals, etc.

The transmission means reads out the character data stored in the first memory and synthesizes the character images into a composite video signal together with the image data such as background images, etc. stored in the second memory. Image information and display timing data used to facilitate singing by causing the color of characters comprising the lyrics to change over time in accordance with accompanying melody data as the playing of such accompanying melody data progresses may also be contained in the first memory.

The present invention is also characterized in that at least the second memory, connector, processing means and transmission means are housed inside a long, slender housing; and a microphone element is installed in one end of this elongated housing with respect to the direction of length of the housing.

According to the present invention, the portable karaoke microphone device has a long, slender housing similar to those of existing microphones. At least the second memory, the first memory connector to which the first memory is detachably connected, the processing means and the transmission means are housed inside this housing. One or more accompanying melody data are stored in the first memory, and character data, etc. is also stored as described above. Furthermore, the first memory is detachable and replaceable. The microphone element is installed in one end of the elongated housing with respect to the direction of the length, and the singer's voice is converted into an electrical signal. Accordingly, the portable karaoke microphone device can be handled in the same manner as an existing microphone with good operating characteristics.

The present invention is also characterized in that the microphone device includes an input operating means and a control means which controls the operation of the processing means in response to the output from this input operating means.

According to the present invention, since the input operating means is provided, and the operation of the processing means is controlled by operating this input operating means, there is no need to perform various operations in a fixed karaoke apparatus main body as in the prior art, and the operating characteristics are improved.

The present invention is also characterized in that the first memory includes: a nonvolatile memory element which stores accompanying melody data and character data that corresponds to the accompanying melody data in an electrically writable/erasable manner; a casing which accommodates the memory element and whose overall shape is so that the casing can be gripped by fingers; and a connector which is installed in the casing, has a plurality of connecting terminals facing the outside so that the respective connecting terminals are connected to the memory, and connected to an external circuit in a detachable manner.

According to the present invention, the first memory has a structure in which a nonvolatile memory element is accommodated inside a casing, and a connector used for connections is disposed in this casing. This casing has an overall shape so as to be gripped by fingers. For example, the casing has a flat shape similar to that of a postage stamp; and its size is, for example, approximately 20×20×5 mm. Furthermore, the nonvolatile memory elements may be, for example, a flash memory as described above; and the accompanying melody data, character data and other data can be stored in an EEPROM (Electrically Erasable Programmable Read Only Memory).

The present invention is further characterized in that:

the processing means includes an accompanying melody calculation means which reads out accompanying melody data from the first memory and performs a plurality of different types of the predetermined calculations;

the input operating means includes a selected melody setting means, which selects and sets accompanying melody data stored in the first memory, a calculation selection means, which selects the predetermined calculations for the accompanying melody data, and a sound quantity adjustment means, which adjusts the input sensitivity of the microphone and/or the sound quantity of the accompanying melody; and the processing means sets the selected melody, the calculations and the sound quantity in response to the outputs of the selected melody setting means, calculation selection means and sound quantity adjustment means.

According to the present invention, the input operating means includes the selected melody setting means, the calculation selection means and the sound quantity adjustment means. Furthermore, the processing means performs the respective operations of setting selected melodies, performing the calculations and setting the sound quantity in response to the output of the input operating means. In this processing means, predetermined calculations selected by the calculation selection means contained in the input operating means are performed by an accompanying melody calculation means. This processing means may be realized by means of, for example, an ASIC (Application Specific Integrated Circuit).

The present invention is further characterized in that the selected melody setting means selects at least one mode from a plurality of modes that comprise:

a selected melody mode in which one accompanying melody data is read out from the first memory and output, a repeat mode in which one accompanying melody data is read out from the first memory and repeatedly output, a continuous mode in which a plurality of accompanying melody data are successively and continuously read out and output according to the order in which such data is stored in the first memory, a random mode in which a plurality of accompanying melody data are randomly read out from the first memory and output, and a reservation mode in which a plurality of accompanying melody data are read out from the first memory and output in a predetermined order.

According to the present invention, the selected melody setting means provided in the input operating means can select and set at least one mode selected from a plurality of modes that comprises the selected melody mode in which a single accompanying melody data is read out and played back, the repeat mode, the continuous mode, the random mode and the reservation mode. Therefore, with the selected melody setting means, the selection and setting of these numerous operating modes can be accomplished by operating the selected melody setting means of the portable karaoke microphone device. Thus, the operating characteristics are good.

The present invention is also characterized in that the calculation selection means alters the tonality, speed or musical instrument of the accompanying melody data, and selects at least one operation among various operations which alter the respective effects of echo, loudness or surround sound.

According to the present invention, the types of predetermined calculations that can be performed by the accompanying melody calculation means provided in the processing means can be selected by the calculation selection means provided in the input operating means. This calculation selection means can alter, for instance, the tonality, i.e., the key, of the accompanying melody data, the speed, i.e., the tempo, of said data, or the musical instrument on which the accompanying melody data is played. Furthermore, at least one of the effect sounds of echo, loudness or surround sound can be selected. Thus, various operations can be selected by the calculation selection means of the input operating means of the portable karaoke microphone device of the present invention, and the operating characteristics are good.

The present invention is also characterized in that the transmission means transmits a carrier wave in a radio broadcast frequency band modulated by the acoustic signal, and the input operating means includes a transmission selection operating switch which designates transmission/stop of the radio broadcast frequency band by the transmission means.

According to the present invention, a carrier wave in an information frequency band which is modulated by the acoustic signal can be transmitted by means of, for example, frequency modulation, amplitude modulation, etc. Furthermore, the transmission/stop of the radio broadcast frequency band can be designated by means of the transmission selection operating switch provided in the input operating means. By transmitting the carrier wave in a radio broadcast frequency band, it is possible to use a radio receiver to achieve acoustic output of an acoustic signal synthesizing accompanying melody data from the first memory and a voice signal from the microphone element. The transmission means can transmit such a carrier wave in a radio broadcast frequency band via an electrical signal line or via the wireless transmission of electromagnetic waves. Accordingly, karaoke playing and singing can be enjoyed without the use of image data by using a radio receiver instead of a television set.

The present invention is also characterized in that the selected melody setting means includes a disk-form knob and an encoder. The knob is installed in the housing so as to be rotatable and used to select the accompanying melody data for the selected tune mode and reservation mode, and a part of the knob is exposed via an opening in the housing. The encoder is disposed in the housing so as to be rotated by the knob. The processing means selects and sets the accompanying melody data in response to the output of the encoder.

According to the present invention, in, for example, the selected melody mode in which a single accompanying melody data is selected or in the reservation mode in which one or more accompanying melody data are selected, the portion of the knob that is exposed via the opening in the housing is operated by, for instance, the thumb so that the knob is caused to undergo an angular displacement. As a result of this angular displacement of the knob, an electrical signal such as a pulse signal, etc. is led out from the encoder; and the accompanying melody data stored in the first memory is selected and set by the action of the processing means. Thus, the selection of accompanying melody data is accomplished by the disk-form knob with improved operating characteristics.

The present invention is further characterized in that the knob is connected to the input shaft of the encoder via a flexible rotating shaft and includes a switching element which is disposed in the housing and is pressed by the knob when the knob is displaced by being pressed in the direction perpendicular to the rotating shaft, so that the switching state changes; and the processing means, in response to the output of the switching element, plays one selected accompanying melody data in the selected melody mode and stores the accompanying melody data in memory in the order of selection for reservation purposes in the reservation mode.

According to the present invention, the knob is connected to the input shaft of the encoder via the flexible rotating shaft. Therefore, this knob can be pressed and displaced toward the inside of the housing, i.e., in the direction perpendicular to the rotating shaft, from outside the housing. When the knob is pressed and displaced, the switching state of the switching element changes. For example, in a case where the switching element is in an ON or OFF state when left by itself, this switching element changes to an OFF or ON state when pressed by the knob. When the switching element changes its switching state as a result of the pressing of the knob, the selected accompanying melody data is played and played back if it is in the selected melody mode, and the selected accompanying melody data is reserved in the order in which the data is selected if it is in the reservation mode. It would also be possible to use the switching element in only the selected melody mode or reservation mode.

Furthermore, the present invention provides a karaoke apparatus which is characterized in that the apparatus comprises: the portable karaoke microphone device described above and a television set which receives the output of the portable karaoke microphone device, converts the acoustic signal into sound, and displays the composite video signal.

According to the present invention, the output from the portable karaoke microphone device is received by a common household television set which is used to receive television broadcasts. The acoustic signal is converted into sound by a speaker, and the composite video signal is visually displayed on the cathode ray tube or other display means. In this way, karaoke playing and singing can be enjoyed.

The present invention further provides a karaoke apparatus which is characterized in that the apparatus comprises: the portable karaoke microphone device described above; a television set which receives the output of the portable karaoke microphone device, converts the acoustic signal into sound, and displays the composite video signal; a server which transmits accompanying melody data and character data that corresponds to this accompanying melody data via a public telephone line; and a downloader which writes the accompanying melody data and character data transmitted by the server via the public telephone line into the first memory.

According to the present invention, the accompanying melody data and character data are received by the downloader from the server via the public telephone line and are written into the first memory. As a result, desired accompanying melody data can be selected, and this accompanying melody data and character data can be stored in the first memory. The first memory can be realized by means of an EEPROM, etc. such as a flash memory, etc. The memory may have a flat shape and the dimensions of, for example, a postage stamp as described above. Accordingly, such a first memory may be carried alone, so that a number of people carrying such memories can share the portable karaoke microphone device and enjoy karaoke playing and singing. Furthermore, since such a first memory is small in size as described above, the memory can be freely used as desired. For instance, the memory can be suspended from an individual whiskey bottle in eating and drinking establishments, etc.

Furthermore, the present invention also provides a nonvolatile memory device for use in karaoke which includes: a nonvolatile memory element which stores accompanying melody data and character data corresponding to the accompanying melody data in an electrically writable/erasable manner, a casing which accommodates the memory and can be gripped by fingers, and a connector which is installed in the casing, has a plurality of connecting terminals facing the outside so that the respective connecting terminals are connected to the memory and is connected to an external circuit in a detachable manner.

According to the present invention, the nonvolatile memory element is housed in the casing; and when the connector is connected thereto, one or more accompanying melody data as well as image data such as character data, etc. are stored therein. Accordingly, the nonvolatile memory for karaoke use can be carried and mounted in the portable karaoke microphone device, so that people having the memories can enjoy their favorite kind of karaoke singing and playing.

Furthermore, the present invention provides a remote control device for an electronic instrument which is characterized in that the remote control device for an electronic instrument comprises: a housing; a disk-form knob which is rotatably installed in the housing so that a part of this knob is exposed via an opening in the housing; an encoder which is disposed inside the housing and is rotated by the knob that is connected to the input shaft of the encoder via a flexible rotating shaft; and a switching element which is disposed inside the housing and is pressed by the knob when the knob is displaced by being pressed in the direction perpendicular to the flexible rotating shaft so that the switching state of the switching element is changed.

According to the present invention, by using the output of the encoder activated by the rotation of the knob and the output of the switching element activated by the pressing of the knob, it is possible to remote control television sets and other electrical equipment in addition to the portable karaoke microphone device. Thus, the operating characteristics can be improved.

Furthermore, the present invention provides a nonvolatile memory device which includes: a nonvolatile memory element which stores acoustic data and image data that corresponds to the acoustic data in an electrically writable/erasable manner; a casing which accommodates the memory and can be gripped by fingers; and a connector which is installed in the casing, has a plurality of connecting terminals facing the outside so that the respective connecting terminals are connected to the memory, and is connected to an external circuit in a detachable manner.

In the present invention, the nonvolatile memory device can be used not only for karaoke; and since the acoustic data and image data such as character data, etc. are stored in the nonvolatile memory element, the memory device can be used in a broad range of technical fields.

BEST MODE FOR CARRYING OUT THE INVENTION

Figure 1:
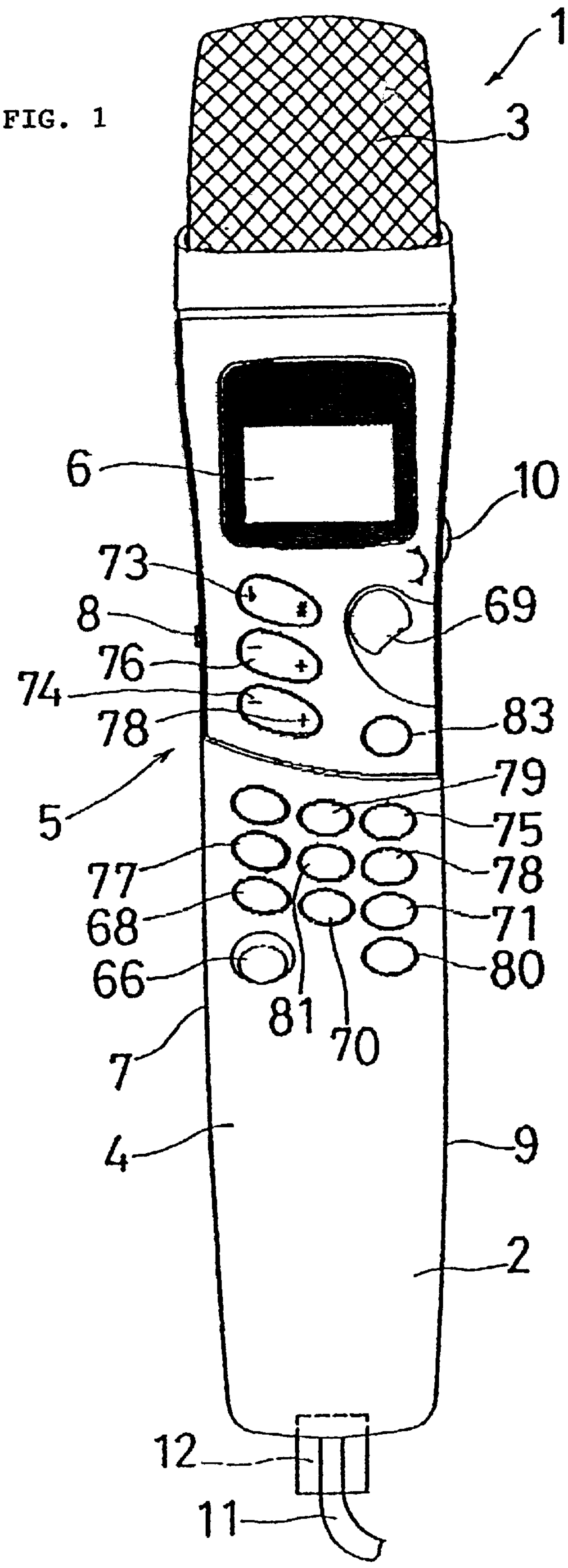
FIG. 1 is a front view of a portable karaoke microphone device according to one embodiment of the present invention.

FIG. 1 is a front view of a portable karaoke microphone device according to one embodiment of the present invention. A microphone element 3 which converts the voice of a karaoke singer into an electrical signal is disposed in one end portion (with respect to the direction of the length; namely, the upper end portion in FIG. 1) of a long, slender housing 2 which has the shape of substantially a rectangular parallelepiped. Key switches 5 consisting of a plurality of pushbuttons are provided on the front panel 4 of the housing 2, and a liquid crystal display means 6 is also provided. A transmission selection operating switch 8 is disposed on the left-side portion 7 of the housing 2, and a part of a disk-form knob 10 is exposed on the right-side portion 9 of the housing 2. A connector 12 which allows the attachment and detachment of a flexible cord 11, which is a cable, is disposed in the other end portion of the housing 2 with respect to the direction of the length of the housing (i.e., the lower end portion in FIG. 1).

Figure 2:
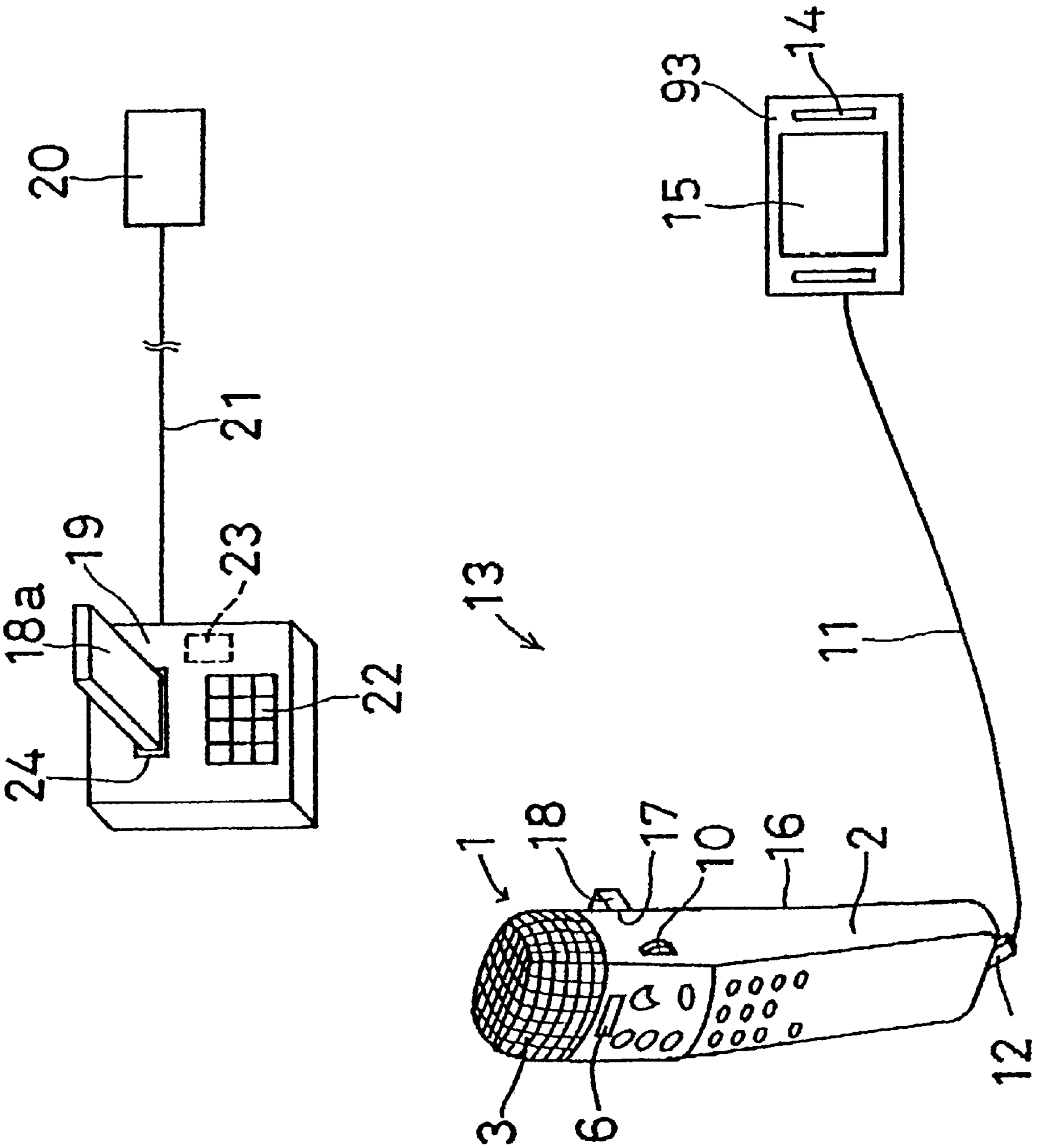
FIG. 2 is a block diagram which illustrates the overall construction of the karaoke apparatus 13 of the present invention, which is equipped with the portable karaoke microphone device 1 shown in FIG. 1.

FIG. 2 is a block diagram which illustrates the overall constitution of the karaoke apparatus 13 of the present invention which is equipped with a portable karaoke microphone device 1 shown in FIG. 1. The microphone device 1 is connected to the antenna input terminal of a television set 13 via the flexible cord 11. As a result, an acoustic signal can be output from the speakers 14 of the television set 13, and background images and characters such as lyrics, etc. can be displayed on a display means 15 which is a cathode ray tube or liquid crystal display device. In order to receive carrier waves modulated by the acoustic signal and composite video signal from the microphone device 1, the television set 13 is selected to be in a reception state with a television broadcast channel frequency that is free of any broadcast waves.

A first memory connector 17 is disposed in the back surface 16 of the housing 2 of this microphone device 1, so that a first memory 18 can be attached to and detached from the first memory connector 17. The first memory 18 is an EEPROM such as a nonvolatile flash memory, etc. Accompanying melody data conforming to MIDI standards is stored in this first memory; and character data such as lyrics, etc. corresponding to the accompanying melody data is also stored therein. Other image data may also be stored in the first memory 18. In regard to such image data, for example, data for display configurations in which singing is facilitated by causing the colors of characters representing lyrics to change over time as the playing of the accompanying melody data progresses, or display timing data for image data which conforms to the progression of the accompanying melody data over time, etc., may be stored in the first memory 18.

Figure 4:
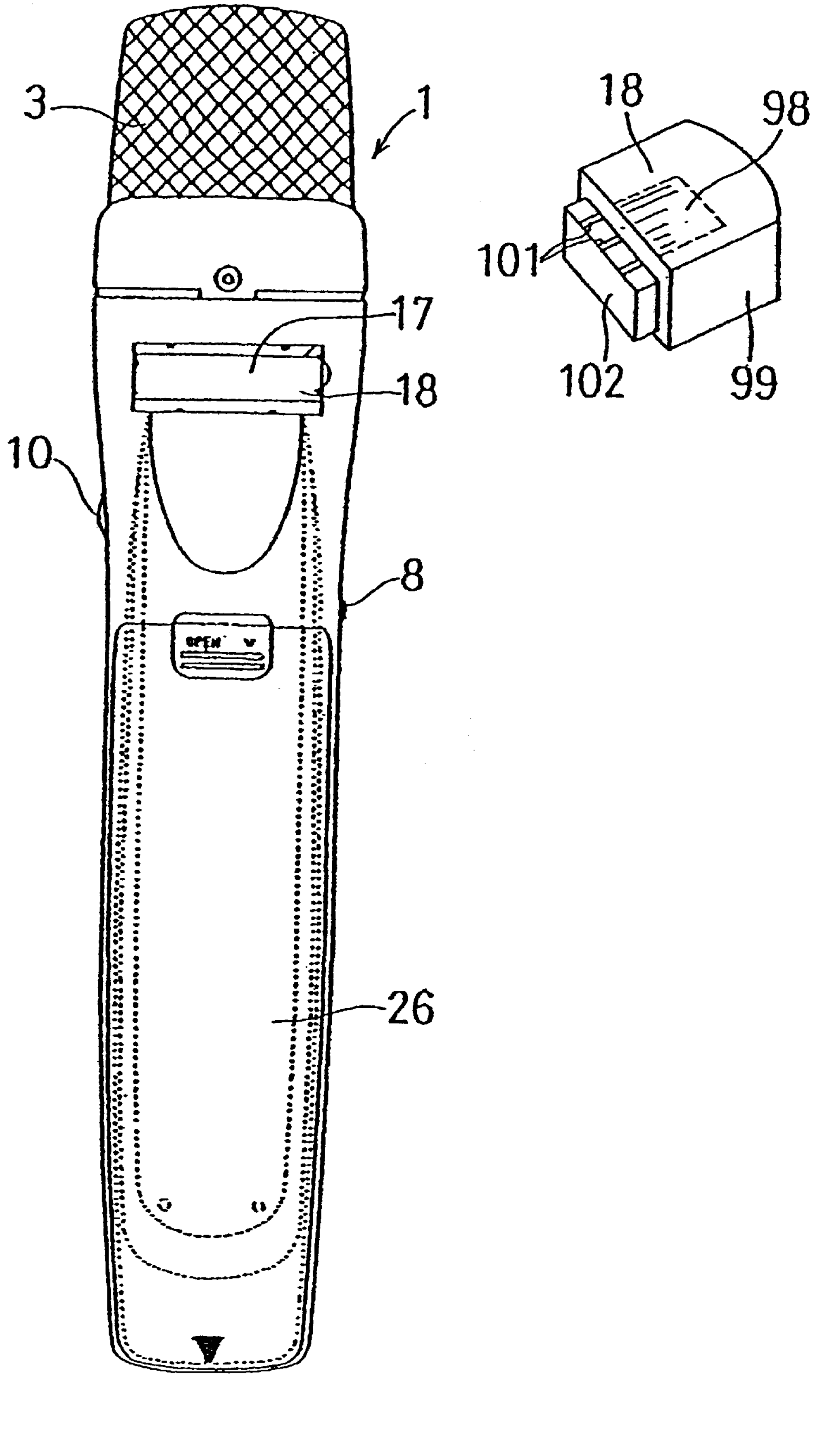
FIG. 4 is a back view of the portable karaoke microphone device 1.

The first memory 18 shown in FIG. 4 comprises a nonvolatile memory element 98, a casing 99 which accommodates this memory element 98, and a connecttor 102 which has connecting terminals 101. The connecttor 102 can be electrically connected in a detachable manner to the first memory connector 17 of the microphone device 1. The overall shape of the casing 99 is designed so that the casing 99 can be gripped by fingers. For example, the casing 99 may have the shape and dimensions of a postage stamp. The nonvolatile memory element 98 is an EEPROM which stores the accompanying melody data, character data and other data in an electrically writable/erasable manner. The memory element can be a flash memory, etc.

As indicated by reference numeral 18*a* in FIG. 2, the first memory 18 is detachably mounted in a downloader 19 and receives the accompanying melody data, character data and other image data, etc. from a server 20 via, for instance, a public telephone line 21; and such data is written into the first memory 18. The accompanying melody data and character data, etc., corresponding to this accompanying melody data may be stored in this first memory 18. In the downloader 19, a connection is made with the server 20 via the telephone line 21 by operating a key input means 22 which is connected to a processing circuit 23 realized by a microcomputer, etc. Furthermore, discrimination numbers which identify desired accompanying melody data are input by operating the key input means 22 As a result, the server 20 responds to the inputted discrimination numbers, so that the accompanying melody data is received via the telephone line 21 by the processing circuit 23 installed in the downloader 19. As a result of the operation of this processing circuit 23, the accompanying melody data and character data, etc. are stored in the first memory 18. A plurality of (e.g., 5 to 20) accompanying melody data and character data are stored in the first memory 18.

The first memory 18 in which the accompanying melody data and character data, etc. have thus been stored by the downloader 19 is removed from a downloader connector 24 and is mounted, as indicated by the reference numeral 18, in the first memory connector 17 of the housing 2 of the portable karaoke microphone device 1 used in the karaoke apparatus 13.

Figure 3:
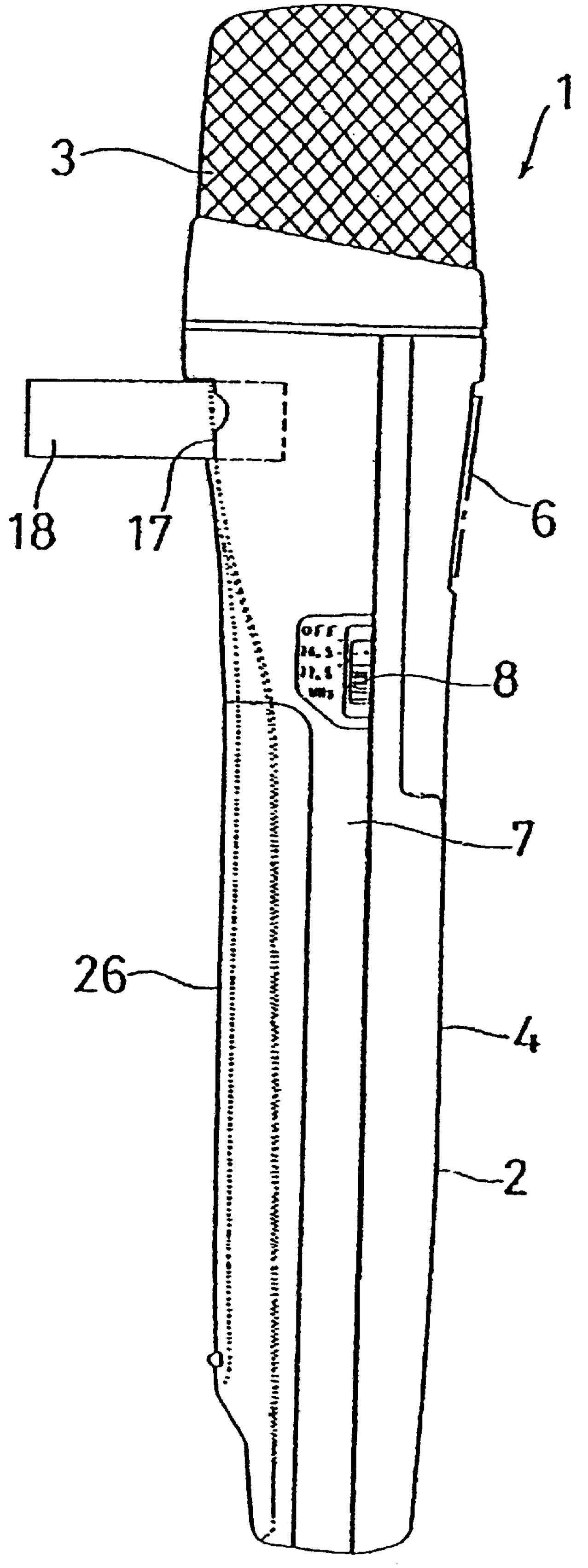
FIG. 3 is a left-side view of the portable karaoke microphone device 1.

FIG. 3 is a left-side view of the microphone device 1, and FIG. 4 is a back view of the microphone device 1. The transmission selection operating switch 8 is used so as to switch a carrier wave in a radio broadcast frequency band, which is modulated by the acoustic signal, for example, by frequency modulation, etc, between 76.5 MHZ and 77.5 MHZ and to stop the transmission of such a carrier wave. A cover 26 of the housing 2 is detachable, so that a battery 27 (see FIG. 7 described below) can be replaced.

Figure 5:
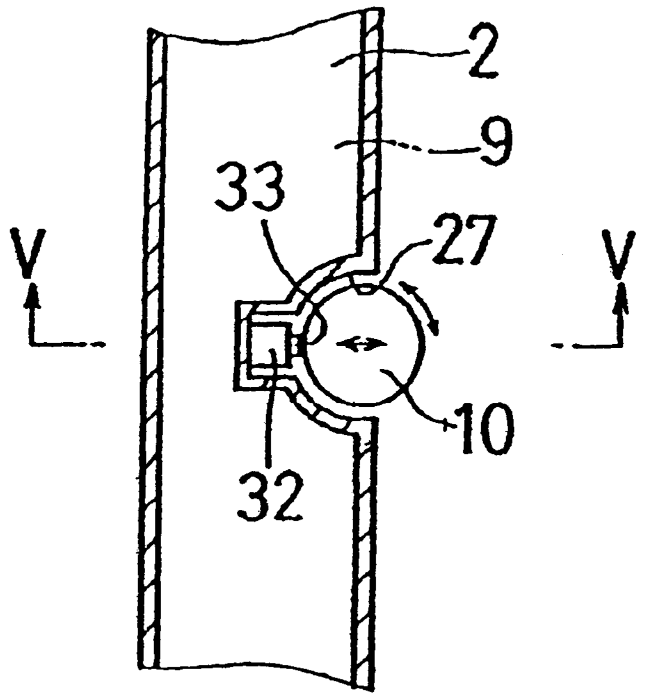
FIG. 5 is a sectional view which shows the right-side surface of the portable karaoke microphone device 1.
Figure 6:
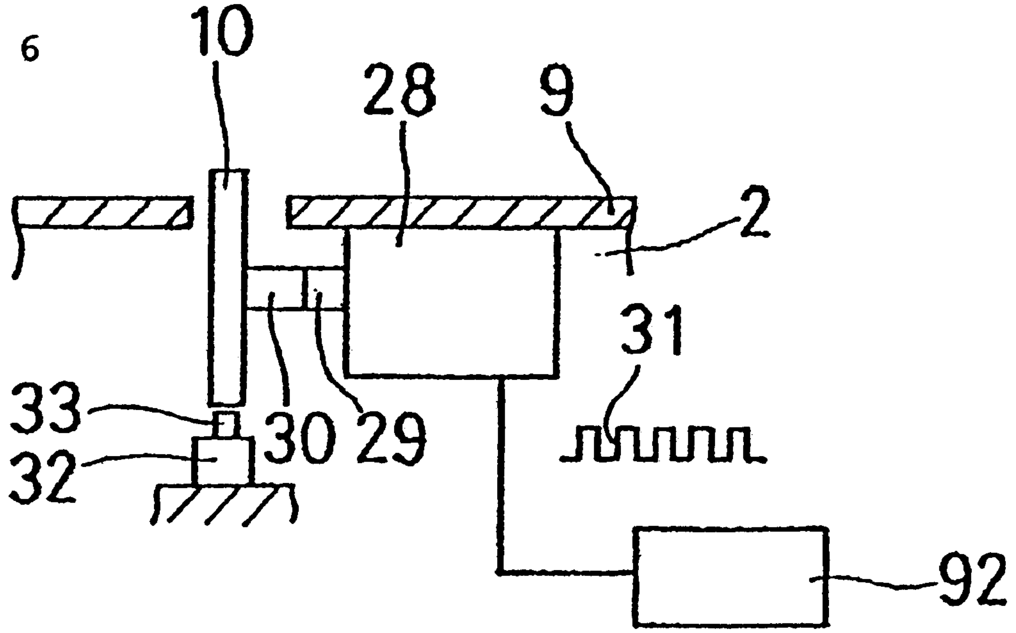
FIG. 6 is a sectional view seen from the sectional line VI—VI in FIG. 5.

FIG. 5 is a sectional view of a part of the right-side of the microphone device 1, and FIG. 6 is a sectional view seen from the line VI—VI in FIG. 5. A part of the disk-form knob 10 is exposed and protrudes from an opening 27 formed in the right-side of the housing 2. The knob 10 is fastened via a rotating shaft 30 consisting of a material which possesses flexibility such as a rubber, synthetic resin, etc. to the input shaft 29 of an encoder 28 which is disposed inside the housing 2. Thus, when left alone, the knob 10 is free to rotate about the horizontal axial line of the housing 2 in the left-right direction in FIG. 1, i.e., the axial line oriented in the perpendicular direction to the drawing sheet for FIG. 5, and oriented in the left-right direction in FIG. 6. When the knob 10 is rotated about this axial line, a pulse signal indicated by reference numeral 31 in FIG. 6 is output from the encoder 28 and is counted by a counter a2. The number of pulses in the pulse signal 31 corresponds to the rotational angle of the knob 10.

A switching element 32 is provided to a point further inside the housing 2 (to the left in FIG. 5, downward in FIG. 6) than the knob 10. The switching element 32 has an operating portion 33. The operating portion 33, when being pressed by the knob 10, changes the switching state of the switching element 32 from ON to OFF and from OFF to ON.

It can be designed so that instead of the encoder 28 the knob 10 is connected via the rotating shaft 30 to the input shaft of a rotary switch. Such a rotary switch is designed so that a moving contact successively switches the state of electrical continuity in a selective manner among a plurality of fixed settings in response to the rotational angle of the knob 10, and thus of the input shaft. The output of such a rotary switch may be applied to a processing circuit 59 so that an operation similar to that of the numerical value of the output of the encoder 28 is performed.

Figure 7:
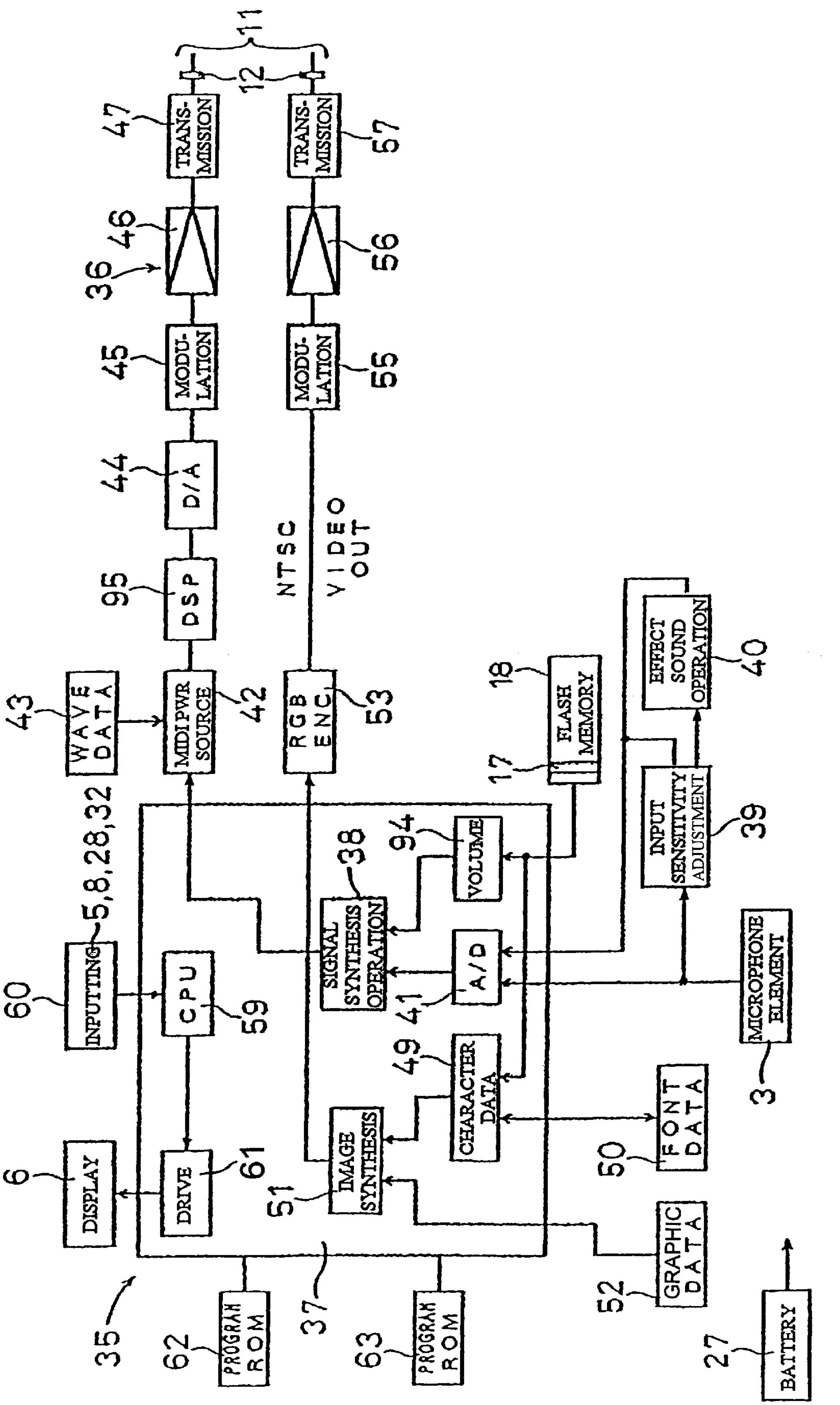
FIG. 7 is a block diagram which illustrates the overall construction of the portable karaoke microphone device 1.

FIG. 7 is a block diagram of the overall constitution of the microphone device 1. A processing means 35 and a transmission means 36 are shown in FIG. 7. The processing means 35 includes a processing circuit 37 which is realized by an ASIC, etc. Of the contents stored in the first memory 18, the accompanying melody data is sent to a signal synthesis operating circuit 38 via the first memory connector 17. The voice signal from the microphone element 3 is sent to an analog/digital converter circuit 41 via an input sensitivity adjustment circuit 39 and an effect sound operating circuit 40, and the digital voice signal thus obtained is sent to the signal synthesis operating circuit 38. Accompanying melody data from the first memory 18 is input into the signal synthesis operating circuit 38 via a sound quantity adjustment means 94. The voice signal from the microphone element 3 thus obtained and the accompanying melody data from the first memory 18 are synthesized by the signal synthesis operating circuit 38, and the result is sent to MIDI sound source circuit 42. The tonality, speed and musical instrument of the accompanying melody data can be altered by a signal sent from a waveform data circuit 43. In the effect sound operating circuit 40, the respective effects of echo, loudness and surround sound are changed and adjusted.

The synthesized acoustic signal thus obtained is sent to a digital/analog converter 44 via an acoustic signal operating circuit DSP (Digital Signal Processor) 95. This signal is converted into an analog signal and is then input into a modulator 45. As a result, the acoustic signal performs a frequency-modulation of the acoustic carrier wave; and this signal passes through a power amplifying circuit 46 and is sent out to the flexible cord 11 from a transmission circuit 47 via the connector 12.

The character data stored in the first memory 18 is sent to a character data creation circuit 49. A memory 50 in which font data is stored is connected to this character data creation circuit 49. In character data discrimination signals, character data corresponding to the discrimination data is read out from the memory 50 in the character data creation circuit 49 and is sent to an image synthesis circuit 51.

The second memory 52 stores a plurality of different types of background image data and sends this data to the image synthesis circuit 51. The plurality of different types of background image data stored in the second memory 52 are successively selected and read out in step a32 in FIG. 8 (described later) and then led out as a composite image signal. The memories 50 and 52 may consist of nonvolatile memories, e.g., flash memories.

Respective horizontal and vertical synchronizing signals are added to the synthesized image signal formed by the synthesis of character data and background image data in the image synthesis circuit 51, and a composite video signal is led out from line 54 in a composite video signal creation circuit 53. This composite video signal is constructed according to, for example, the NTSC (National Television System Committee, i.e., the American television system committee) system. The composite video signal modulates a video carrier wave in the modulator 55; and this signal is power-amplified by a power amplifying circuit 56 and then output to the flexible cord 11 by a transmission circuit 57.

An input operating means 60, which is provided with a processing circuit 59 such as a micro-computer, etc. and includes a key input means 5, a transmission selection operating switch 8, the encoder 28 and the switching element 32, etc., is connected to the first memory connector 17; and a driving circuit 61 which drives a liquid crystal display element 6 is also connected to the first memory connector 17. The operation of this processing circuit 59 is accomplished by executing programs stored in a programmable read-only memory 62; and a random-access memory 63 which is a working memory used to execute the above-described programs is also connected. In FIG. 7, the connecting lines for the constituting elements connected to the processing circuit 59 are partially omitted in order to prevent FIG. 7 from becoming too complicated.

Figure 8:
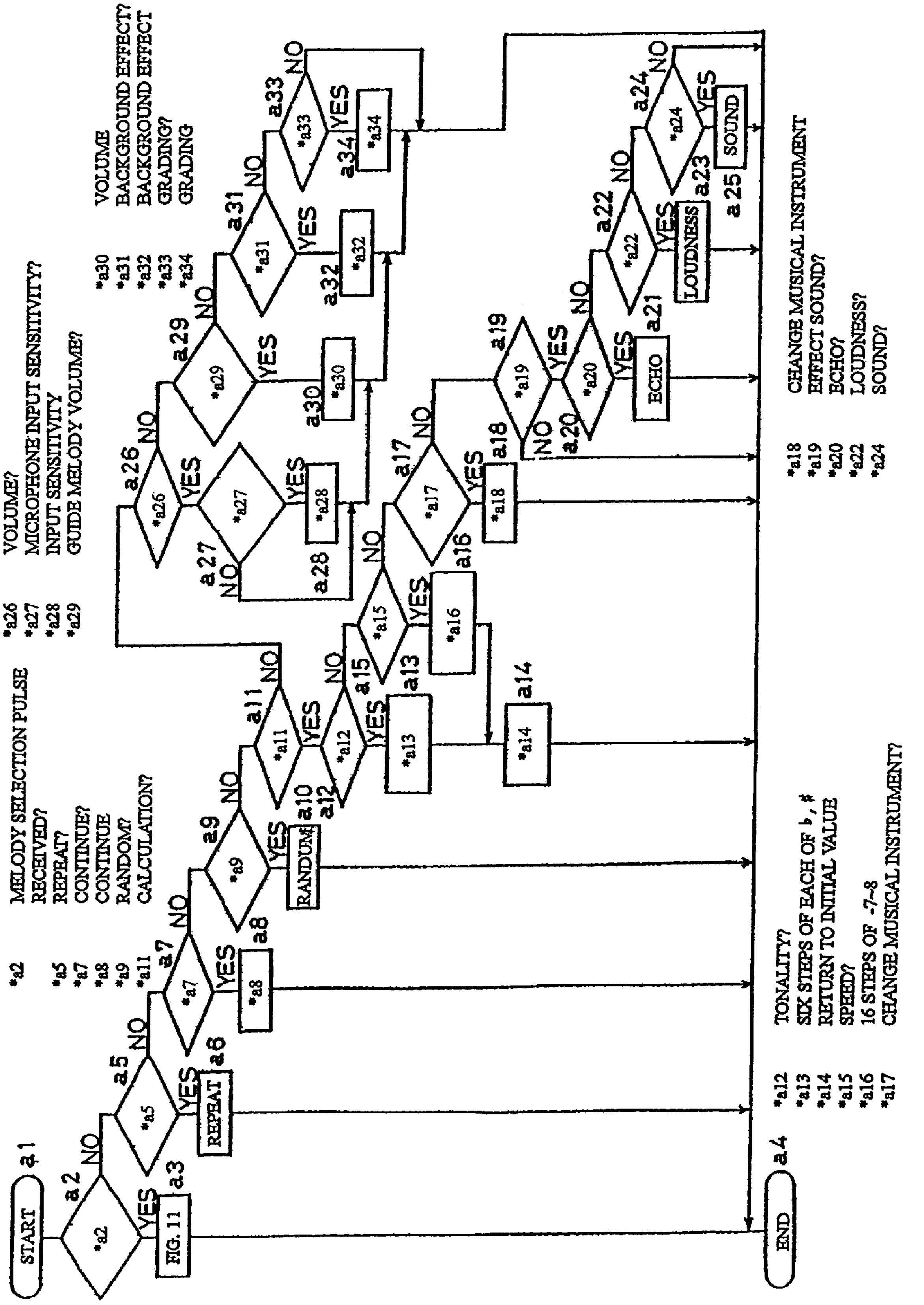
FIG. 8 is a flow chart which illustrates the operation of the processing circuit 59.
Figure 9:
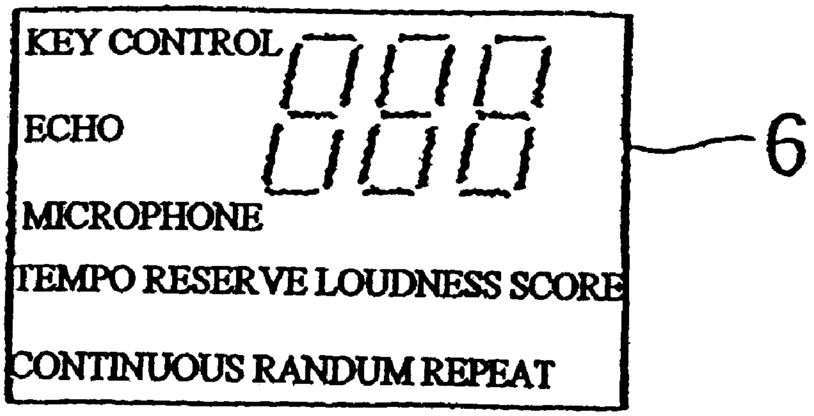
FIG. 9 is an illustration of the operating conditions of the portable karaoke microphone device 1.

FIG. 8 is a flow chart which illustrates the operation of the processing circuit 59. In order to switch on the power supply, the power supply key 66 of the key input switches 5 is pressed continuously for a predetermined period of time, e.g., three seconds. During this operation, the operation is stopped by pressing the power supply key 66. The operating state of the microphone device 1 is displayed on the display means 6 as shown in FIG. 9. Moving from step a1 to step a2, a judgement is made as to whether or not the knob 10 has been operated so that a pulse signal 31 for melody selection has been led out from the encoder 28 and received by the processing circuit 59. In cases where it is determined that the pulse signal 31 has been generated, the process shifts to step a3, and the melody selection mode and reservation mode in FIG. 11 (described later) are executed. In cases where the knob 10 has not been rotated and no pulse signal 31 has been generated, the process moves to step a5.

Figure 10:
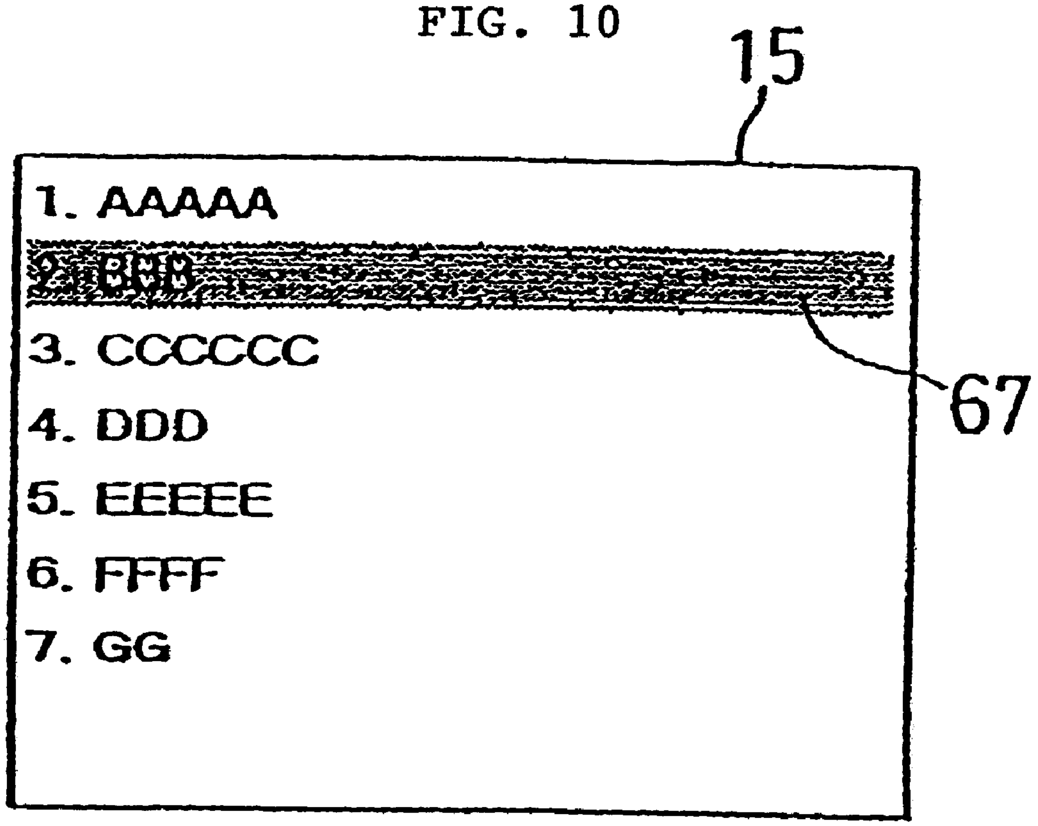
FIG. 10 is a front view of the display screen displayed on the display means 15 of a television set 13.

In step a3, the title of the accompanying melody selected by the rotation of the knob 10 is displayed on the display means 15 of the television set 13 as shown in FIG. 10.

FIG. 10 is a front view of the display screen displayed on the display means 15 of the television set 13. The titles of the accompanying melody data stored in the first memory 18 are displayed, and the title of the melody selected by the operation of the knob 10 is displayed by a display pattern which differs from that of the other melody names, such as cross-hatching, etc. as indicated by reference numeral 67.

When the repeat key 68 is pressed in step as, the corresponding single accompanying melody data is repeatedly played back, and this repeat operation continues in step a6 until the start/stop key 69 is pressed.

When the continuous key 70 is pressed in step a7, all of the accompanying melody data stored in the inserted first memory 18 is continuously played in the order in which the data was stored. This continuous operation continues until the stop key 69 is pressed. The number of the accompanying melody being played is displayed by the display element 6 during the play of the accompanying melody. If it is ascertained in step a9 that the random key 71 has been pressed, the accompanying melody data stored in the first memory 18 continues to be played in random order in the next step a10 until the start/stop key 69 is pressed. However, in cases where reserved melodies are stored in the memory 63, the input by way of this random key 71 is ignored, and the playing of the reserved melodies takes precedence.

In step a11, a judgement is made as to whether or not a calculation selection operation has been performed. This calculation selection operation refers to the alteration of the tonality, speed or musical instrument of the accompanying melody data, or to the selection of at least one operation altering the respective effects of echo, loudness or surround sound. For example, when the key control button 73 for tonality is operated, this is ascertained in step a12; and in the next step a13, an altered sound in six steps each of flat ♭ or sharp ♯ is calculated and determined. At the point in time where the accompanying melody being played ends, this sound is returned to the initial value in step a14. When it is ascertained in step a15 that the tempo key 74 which is used to alter the speed of the accompanying melody while the melody is being played has been operated, a variable step number is calculated across 16 steps ranging from −6 to −8 in step a16, and the speed is altered. In step a14, the speed returns to the initial value when the accompanying melody being played ends. However, during the operation in which an accompanying melody is repeated, the set speed is maintained.

In step a17, it is ascertained whether or not the musical instrument selection key 75 has been operated in order to alter the musical instrument that plays the accompanying melody while the melody is being played. In cases where the musical instrument selection key 75 is operated, the instrument number is displayed on the display means 15 of the television set 13 in step a18.

In step a19, it is ascertained whether or not an operation for the effect sounds of echo, loudness or surround sound has been performed. When it is ascertained in step a20 that the echo key 76 has been operated; then, in the next step a21, a set value is displayed on the respective screens of the display element 6 and display means 15 each time the echo key 76 is pressed (across a variable step number of 15 steps of the echo), and this set value is maintained until the power supply key 66 is switched off. When it is ascertained in step a22 that the loudness key 77 has been operated, a loudness operation is performed in the next step a23; and this is displayed as ON on the screens of the display element 6 and display means 15. When the key is pressed again, then OFF is displayed. The initial value of loudness is the OFF state. This set state of loudness is maintained until it is cut off by the power supply key 66.

When it is ascertained in step a24 that the surround key 78 has been operated, a surround operation is performed in the next step a25; and this is displayed on the respective screens of the display element 6 and display means 15. The display of ON or OFF is performed in the same manner as in the step a23. The initial value is OFF, and the set state of surround sound is maintained until the power supply is switched off.

In step a26, it is ascertained whether or not a key operation for sound quantity adjustment has been performed. In other words, when it is ascertained in step a27 that the microphone key 78 used for the input sensitivity of the microphone element 3 has been operated, then the set value with a variable step number of 15 steps is displayed on the respective screens of the display element 6 and display means 15 in the next step a28; and this set value is maintained until the power supply is switched off.

In step a29, it is ascertained whether or not the guide melody key 79 has been operated in order to adjust the sound quantity of the accompanying melody. If this key has been operated, the process moves to the next step a30. Four steps may be set for adjustment of the sound quantity of the accompanying melody, and the operation of the guide melody key 79 causes the set value to be displayed on the respective screens of the display element 6 and display means 15. This set value is cycled. At the point in time where the melody being played ends, the set value of the sound quantity returns to the initial value.

Furthermore, in step a31, it is ascertained whether or not the background alteration key 80 has been operated. If this key has been operated, the background image data stored in the memory 52 is changed and displayed on the screen of the display means 15. In cases where the grading key 81 is pressed in step a33, a grading function is performed in step a34, and the set value is respectively displayed on the screens of the display element 6 and display means 15. Either ON or OFF is displayed. The initial value is the ON state; and the set state is maintained until the power supply is switched off.

Figure 11:
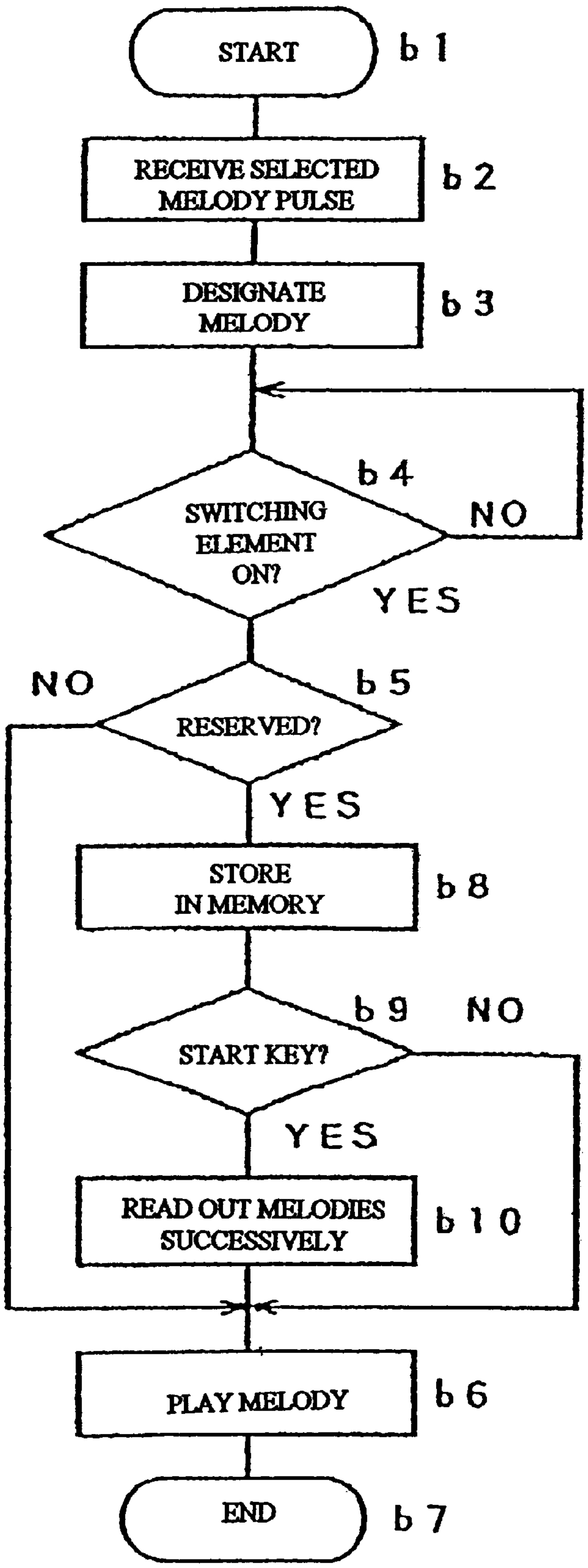
FIG. 11 is a flow chart which illustrates the operations performed in step a3 of FIG. 8 in greater detail.

FIG. 11 is a flow chart which illustrates in greater detail the operation achieved in step a3 of FIG. 8. The operation performed in this FIG. 11 is accomplished by the processing circuit 59. The process moves from step b1 to step b2; and when the knob 10 is operated so that a pulse signal 31 is led out from the encoder 28, this pulse signal is received by the processing circuit 59. Then, in the next step b3, an accompanying melody corresponding to the count value counted by the counter 32 is designated. The count by the counter 32 is realized by means of the processing circuit 59.

In step b4, it is ascertained whether or not the knob 10 has been pressed toward the inside of the housing 2. In other words, it is ascertained whether or not the switching element 32 has been switched to an ON state by the pressing operation of the knob 10. If the knob 10 has been pressed, it is ascertained in the next step b5 whether or not the reservation key 83 has been operated. If the reservation key 83 has not been operated, the accompanying melody designated in step b3 is played in step b6, and this series of operations is completed in step b7. If it is ascertained in step b5 that the reservation key 83 has been operated, then the numbers of the reserved accompanying melodies are stored in the order of reservation in the memory 63 in the next step b8. In step b9, it is ascertained whether or not the start/stop key 69 has been operated. If this key has been operated, the accompanying melodies are read out from the first memory 18 and successively played in the order of the accompanying melodies stored in the memory 63. The above series of operations is completed in step b7.

INDUSTRIAL APPLICABILITY

As seen from the above, in the invention, an acoustic signal and a composite video signal are output from the portable karaoke microphone device. By using such a construction instead of a construction in which a modulated carrier wave with a television broadcast frequency is transmitted as will be described later, respective signals of karaoke playing and singing can be sent via a flexible cord to the acoustic input terminal and video input terminal of a common household television set, so that karaoke playing and singing can be enjoyed.

In the invention, as a result of the use of a handy portable karaoke microphone device, karaoke playing and singing can easily be enjoyed using, for example, a common household television set, so that the operating characteristics are improved. Furthermore, the device is compact, and one or more desired accompanying melodies can be stored in the first memory. Accordingly, there is no need to provide various recording media such as laser disks, video disks, etc. as in the conventional techniques.

The portable karaoke microphone device of the present invention is handy and can be used in an expanded range of locations. For example, on sightseeing buses, karaoke playing and singing can be enjoyed using a television set, radio, etc. installed in the sightseeing bus beforehand. Furthermore, the present invention can also be used in outdoor facilities, etc.

In the invention, character data such as lyrics, etc. is also stored in the first memory in addition to the accompanying melody data, and this character data can be seen together with a background on the display means of the television set. Accordingly, singing is facilitated.

In the invention, a microphone element is disposed on one end of the long, slender housing of the portable karaoke microphone device, so that handling similar to that of existing microphones is possible. Thus, the operating characteristics are good.

In the invention, an input operating means is installed in the portable karaoke microphone device, so that the operating characteristics are superior. Furthermore, since there is no need to perform various operations in a fixed type karaoke apparatus main body as in the prior art described above, the operating characteristics are improved.

In the invention, the first memory has an overall shape so that the memory can be gripped by fingers and is about the size of a postage stamp. Accordingly, the handling characteristics are extremely good.

In the invention, the input operating means installed in the portable karaoke microphone device can perform selected melody setting, calculation selection and sound quantity adjustment, etc. Accordingly, the operating characteristics are improved as a result of this constitution as well.

In the invention, when a selected melody is set, at least one mode can be selected from a plurality of modes comprising a selected melody mode in which one accompanying melody data is output, a repeat mode in which one accompanying melody data is repeated, a continuous mode in which a plurality of accompanying melodies are continuously played in the order in which the melodies are stored in the first memory, a random mode in which a plurality of accompanying melody data are randomly read out from the first memory and output, and a reservation mode in which a plurality of accompanying melody data are read out and output in a predetermined order. The output of accompanying melody data can be performed in these numerous different configurations; accordingly, the operating characteristics are good.

In the invention, in selecting calculations, the tonality, speed or musical instrument of the accompanying melody data can be altered, or at least one operation altering the respective effects of echo, loudness or surround sound can be performed. Accordingly, the operating characteristics are favorable as a result of this constitution as well.

In the invention, an acoustic signal can be output by mean of a radio receiver instead of a television set, or in combination with a television set, so that karaoke playing and singing can be enjoyed. Thus, a simple method of enjoyment is possible.

In the invention, accompanying melody data can be selected in the selected melody mode and reservation mode by rotating a knob; accordingly, the operating characteristics are good.

In the invention, the switching state of the switching element can be altered by pressing the knob; as a result, operations in either the selected melody mode or reservation mode, or both, can be controlled. In this way, operations can be performed with one hand, and therefore, the operating characteristics are good.

In the invention, a karaoke apparatus is realized using the portable karaoke microphone device of the present invention and an existing television set. Accordingly , the construction of the karaoke apparatus can be simplified; and such a karaoke apparatus can be used by many people.

In the invention, accompanying melody data and character data from a server can be written into the first memory by a downloader via a public telephone line, and karaoke playing and singing can be enjoyed using the first memory that contains desired accompanying melody data which has thus been written. The downloader maybe constructed so as to be connected to a household telephone; and this downloader may also be constructed so as to be connected to a portable telephone, thus allowing accompanying melody data, etc. to be written into the first memory from the server via the downloader by so-called "mobile communications." As a result, the range of use of the karaoke apparatus is greatly expanded.

In the invention, a nonvolatile memory element containing desired accompanying melody data is accommodated in a casing, and this memory element is connected to a portable karaoke microphone device or other device by means of a connector. Such a nonvolatile memory device for karaoke use can be carried on one's person, so that karaoke playing and singing can be enjoyed, for example, at any location where a portable karaoke microphone device is provided. Since such a nonvolatile memory device for karaoke use is compact, it can easily be carried. Thus, the operating characteristics are good, and the freedom of use is attractive.

In the invention, input by means of rotation and pressing of a knob can be performed in a portable karaoke microphone device constituting a remote control device for karaoke, etc. in an electronic apparatus such as a television set, etc. Accordingly, a remote control device with superior operating characteristics can be realized.

In the invention, the nonvolatile memory device can be used in a broad range of technical fields for purposes other than karaoke playing and such as games, music, various types of data conversions, etc.

What is claimed is:

1. A portable karaoke microphone device characterized in that said microphone device comprises:

- a nonvolatile first memory which stores accompanying melody data,
- a nonvolatile second memory which stores image data,
- a first memory connector to which said first memory is detachably and replaceably connected,
- a microphone element which converts a voice signal into an electrical signal,
- a processing means which creaks an acoustic signal by synthesizing said accompanying melody data from said first memory and said voice signal from said microphone element, and which creates a composite video signal using image data from said second memory,
- a transmission means which transmits a carrier wave that has a television broadcast channel frequency modulated by the acoustic signal and composite video signal from the processing means, and
- a housing in which at least said second memory, a connector for connecting said microphone to external devices via a cable, said processing means, and said transmission means are provided, and said microphone element being installed in one end of said housing with respect to a direction of length of said housing.

2. The portable karaoke microphone device according to claim 1, characterized in that said first memory comprises:

- a nonvolatile memory element which stores accompanying melody data and character data corresponding to said accompanying melody data in an electrically writable/erasable manner,
- a casing which accommodates said memory element, and whose overall shape is such that said casing can be gripped by fingers, and
- a connector which is installed in said casing, which has a plurality of connecting terminals facing outside so that respective said connecting terminals are connected to said first and second memories for detachably connecting said first and second memories to an external circuit.

3. The portable karaoke microphone device according to claim 1 or 2, characterized in that:

- said processing means has an accompanying melody calculation means which reads out accompanying melody data from said first memory and performs a plurality of different types of predetermined calculations,
- said microphone device further includes an input operating means comprising a selected melody setting means which selects and sets accompanying melody data stored in said first memory, a calculation selection means which selects said predetermined calculations for said accompanying melody data, and a sound quantity adjustment means which adjusts an input sensitivity of said microphone or a sound quantity of accompanying melody, and
- said processing means sets a selected melody, said calculations and sound quantity in response to outputs of said selected melody setting means, calculation selection means and sound quantity adjustment means.

4. The portable karaoke microphone device according to claim 3, characterized in that said selected melody setting means selects at least one mode from a plurality of modes that comprises:

- a random mode in which a plurality of accompanying melody data are randomly read out from said first memory and outputted, and
- a reservation mode in which a plurality of accompanying melody data are read out from said first memory and outputted in a predetermined order.

5. The portable karaoke microphone device according to claim 3, characterized in that said calculation selection means alters tonality, speed or musical instrument of said accompanying melody data, and selects at least one operation among various operations which alter respective effects of echo, loudness or surround sound.

6. The portable karaoke microphone device according to claim 4, characterized in that:

said selected melody setting means has a disk-form knob and an encoder which is disposed inside said housing and is rotated by said disk-form knob, said disk-form knob being disposed on a rotating shaft so as to be rotated in said housing and used to select accompanying melody data for selected tune mode and reservation mode, a part of said knob being exposed via an opening formed in said housing so that said part of said knob is located at a location where an extended thumb is positioned when a user holds said microphone with one hand, and said knob including a switching element that changes switching state by being pressed by said knob when said knob is pressed in a direction perpendicular to said rotating shaft; and said processing means, in response to an output of said switching element, plays one selected accompanying melody data in selected melody mode, and stores accompanying first melody data in memory in an order of selection for reservation purposes in said reservation mode.

7. The portable karaoke microphone device according to claim 2, characterized in that:

said transmission means for transmitting a carrier wave in a radio broadcast frequency band modulated by said acoustic signal, and said microphone devices further includes an input operating means comprising a transmission selection opening switch which designates transmission/stop of radio broadcast frequency band by said transmission means.

8. A karaoke apparatus characterized in that said karaoke apparatus comprises:

a portable karaoke microphone device, said portable karaoke microphone device comprises:

a nonvolatile first memory which stores accompanying melody data, a nonvolatile second memory which stores image data, a first memory connector to which said first memory is detachably and replaceably connected, a microphone element which converts a voice signal into an electrical signal, a processing means which creates an acoustic signal by synthesizing said accompanying melody data from said fist memory and said voice signal from said microphone element, and which creates a composite video signal using image data from said second memory, a transmission means which transmits a carrier wave that has a television broadcast channel frequency modulated by the acoustic signal and composite video signal from the processing means, and a housing in which at least said second memory, a connector for connecting said microphone to external devices via a cable, said processing means, and said transmission means are provided, and said microphone element being installed in one end of said housing with respect to a direction of length of said housing, a server which transmits accompanying melody data and character data corresponding to accompanying melody data via a public telephone line, and a downloader which writes said accompanying melody data and character data transmitted by said server via said public telephone line into a first memory;

and wherein said first memory detachably provided in said microphone device is detached and mounted back during downloading.

* * * * *